UNITED STATES PATENT OFFICE.

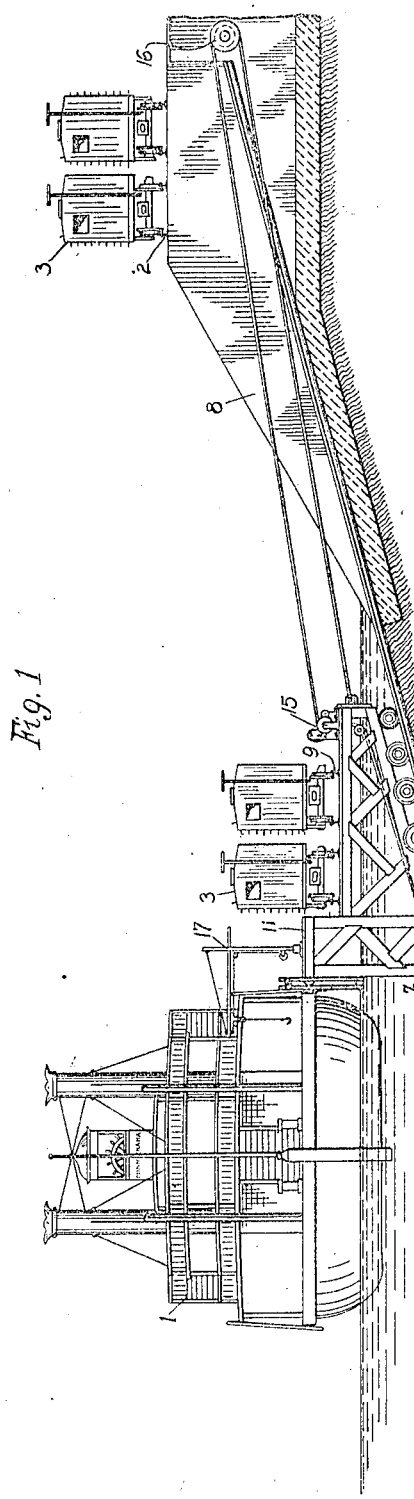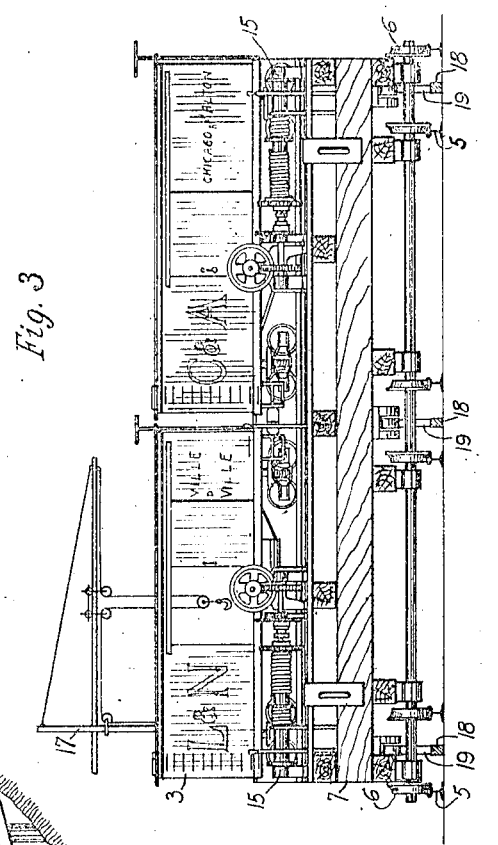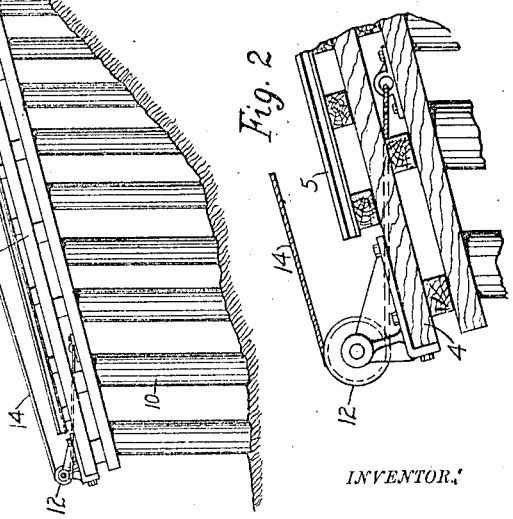

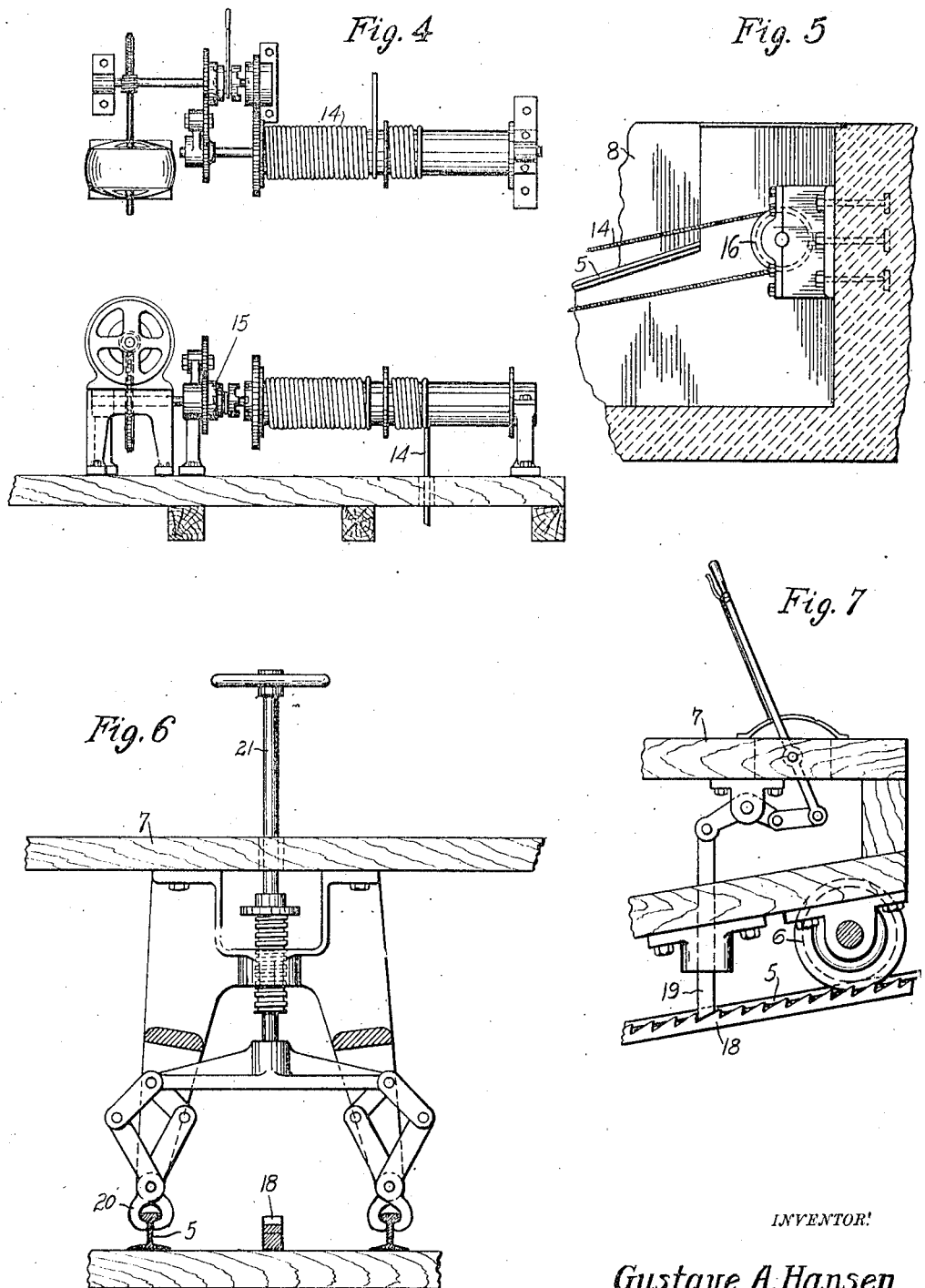

GUSTAVE A. HANSEN, OF ST. LOUIS, MISSOURI.

STEAMBOAT AND BARGE LOADING AND UNLOADING SYSTEM.

1,298,499.   Specification of Letters Patent.   Patented Mar. 25, 1919.

Application filed August 26, 1918. Serial No. 251,569.

*To all whom it may concern:*

Be it known that I, GUSTAVE A. HANSEN, a citizen of the United States, residing at St. Louis, in the State of Missouri, have invented certain new and useful Improvements in Steamboat and Barge Loading and Unloading Systems, of which the following is a specification containing a full, clear, and exact description, reference being had to the accompanying drawings, forming a part hereof.

My invention relates to an improved steamboat and barge loading and unloading system, and it consists in the novel disclosure hereinafter described and claimed.

The object of my invention is to reduce the cost of loading and unloading steamboats, barges, and other vessels, which have heretofore required the services of "roustabouts" and other hand labor in carrying or trucking the freight down to the boat to be loaded, or up the wharf from the boats or vessels being unloaded.

A further object of my invention is to provide an improved mechanical means which will do away with the greater amount of hand labor in loading and unloading vessels.

A further object of my invention is to provide an improved system of loading and unloading vessels, which shall save much time, and enable the vessels to be loaded and unloaded in a very rapid and efficient manner.

In the drawings,

Figure 1 is a transverse section of an apparatus embodying my invention, as arranged for loading and unloading steamboats and barges on an inclined river, lake, or ocean front.

Fig. 2 is an enlarged side elevation of the submerged (or lower) end of a marine railway, used in carrying out my invention.

Fig. 3 is a transverse section of the marine railway, looking from the land toward the steamboat shown in Fig. 1.

Fig. 4 is a detail plan-view of one of the common electric-winches used in moving the cradle upwardly and downwardly upon the cradle of the marine railway.

Fig. 5 is a detail vertical section of the cut, pit, or underground recess at the upper end of the marine railway.

Fig. 6 is a detail view of one of the "grips" or safety-brakes, used in gripping the opposite sides of the rails of the marine railway, to lock the cradle thereon at any desired point, and Fig. 7 is a detail side-elevation of the safety rack-and-dog operating mechanism, to prevent the accidental downward movement of the cradle during operation.

In the present illustration of my invention, the numeral 1 designates the steamboat, barge, or other vessel to be loaded or unloaded; 2 designates the straight rails of railway-tracks located along the top of the inclined water-front; and 3 designates the cars or other vehicles to be loaded or unloaded directly by the use of my invention, without employing the services of "roust-abouts" to carry the freight in so doing.

The numeral 4 designates an inclined marine railway, having straight rails 5 upon which run the wheels 6 of a cradle 7, in transferring the said cars or vehicles 3 from the said rails 2 of the railway-tracks at the top of the said water front to the steamboat or other vessel 1.

Said marine railway has its upper end depressed below the level of said railway rails 2, and located in a transverse cut or passage 8 formed in the inclined water front, so that the cars or vehicles can readily and quickly be run directly onto or off of the straight rails of said cradle 7, which carries rails 9 in alinement with said railway rails 2 when the said cradle is run up to the upper part of said marine railway 4, in receiving or delivering said cars.

The lower portion of the inclined marine railway 4 extends at a suitable incline a considerable distance into the water, upon common piling 10, and this portion of said marine railway is submerged such a depth as to permit the steamboat or other vessel to clear it at all reasonable stages of the river or other body of water. (See Fig. 1).

The said cradle is provided with a horizontal platform 11, which is brought close up to the deck of the steamboat in loading or unloading the latter, and is kept on a level with said deck by running the said cradle up or down a sufficient distance; the steamboat being pushed out by contact of said platform therewith until the top of said platform is flush with said vessel deck.

The said horizontal platform 11 of said cradle, while on a level with the deck of the steamboat 1 (or other vessel), is elevated a sufficient distance above the horizontal top of said cradle 7, to permit the floors of the cars 3 carried by said cradle to be about flush with the said elevated horizontal platform; whereby the three working "decks" (that is,—the floors of said cars 3, the floor of said elevated platform 11, and the deck of said vessel 1) will all be on about the same level, which will greatly add to the efficiency of the apparatus in loading and unloading, as will readily be understood.

One or more common cables 14 have their lower ends anchored to suitable fixed fastening-devices attached to the lower portion of the inclined railway 4, and thence said cables are extended over common pulleys 12 (which do not rotate, as they are used merely as cable holders, to prevent cutting of said cables), and thence said cables extend upwardly and pass around the drum of any suitable winding-apparatus (such as an electric winch 15) located on the shore end of the said horizontal top of the cradle 7, whence additional common cables pass over common grooved pulleys 16 mounted at the upper end of said railway, in said pit, cut, or underground passage 8, below the surface of the street or water front; and from said pulleys 16 the said cables pass down the inclined railway and have their ends fixed to suitable fastening brackets located upon the shore-end of said cradle. (See Fig. 1).

By means of such an arrangement of cables, the said cradle 7 may be drawn downwardly, as well as upwardly, upon said marine railway, as it will often be necessary to force the cradle downwardly and outwardly, and to push the said steamboat 1 (or other vessel) out farther in the water in "lining up" the deck of said vessel with the said platform 11 of the cradle.

It will be readily seen that the farther the vessel is pushed out into the water by contact therewith of the said cradle, the farther the said platform will be depressed, and vice versa.

The cables 14 which are used, as above described, to haul down the cradle are (as shown in detail in Figs. 3 and 4) separate cables from those which are used to haul up said cradle, and the upper ends of said hauling-down cables are (in the present illustration of my invention) shown wound around the drum of the said winch 15 only a few turns, so that a sufficient "bite" upon said drum may be obtained in hauling down the cradle, but when the cradle is to be drawn upward on the inclined railway, the said few turns on said drum will be loosened by the attendant, in a manner well known to those familiar with the use of ship capstans and hoisting-drums, to permit the necessary slacking in hauling up the cradle.

Also, as shown in Figs. 3 and 4, the hauling-up cables are separate from said hauling-down cables, so that in the above-described operation of hauling down the cradle 7 the said hauling-up cables are allowed to slip (or are otherwise disconnected) upon the drum 14 in the well-known manner, for obtaining the necessary slacking therein to permit the downward movement of the said cradle.

A common crane 17 is mounted upon the said platform 11 of said cradle, for convenience in transferring heavy articles.

Safety-racks 18 having ratchet-teeth are extended along the marine railway, so that pawls or dogs carried by said cradle will engage said teeth and prevent accidental downward movement of the cradle.

As shown more clearly in Fig. 6, I provide safety "grips" 20, which engage the opposite sides of the said rails 5 of the marine railway 4, to act as friction brakes for the same during operation, and to lock said cradle at any desired point in its travel, in addition to the previously described safety rack-and-dog operating mechanism, the said grips being operated by a hand-wheel shaft 21 carrying a common hand-wheel at its upper end.

The said dogs or pawls 19 normally gravitate into engagement with the teeth of the said racks 18, and thereby automatically check any accidental downward movement of the said cradle 7, should the said cables 14 (or either of them) break or become loose from their anchorages; but when the cradle is to be lowered, or run out, upon the said marine railway, the said dogs or pawls 19 are raised out of contact with said teeth, and they may be locked out of such contact by means of the common arrangement of hand-lever and connections, shown in detail in Fig. 7.

The operation of my invention will be readily understood without further description.

I have herein shown the cradle 7 fitted with tracks for the accommodation of but two cars at a time, but it is obvious that said cradle may be of larger size to carry more cars, or it may be of smaller size and fitted with rails for one car only; or it may be devoid of any rails in some cases.

I claim:—

An improved loading and unloading apparatus for vessels, consisting of a cut or underground recess formed at the top of an incline adjacent a body of water; an inclined railway, the upper end of which is depressed below the surrounding surface and located and terminates within said cut or recess, and the lower end of which railway is submerged a sufficient depth to permit vessels to float over it; a wheeled cradle mounted upon said inclined railway; a horizontal platform at the top of said cradle; horizontal railway-rails mounted on said horizontal platform and extending in a direction at right-angles to the path of the wheels of said cradle in traversing said inclined railway; railway-tracks on the surface terminating on opposite sides of said cut or underground recess, and located in a plane above the upper end of said inclined railway, to aline with the said rails carried by the said horizontal platform of said cradle when the latter is run into said cut; wire cables for pulling down said cradle, having their lower ends anchored to the submerged lower portion of the said inclined railway, and having the other ends loosely wound around a winding-drum carried by the said cradle; additional cables for hauling up the latter; suitable means mounted upon said cradle, for winding up and unwinding said cables, to force said cradle downwardly and to draw the same upwardly upon said railway, and an additional horizontal platform located at the extreme outer end of the said cradle, and elevated such a distance above the plane of the said platform that said additional platform will be flush with the deck of a vessel being loaded or unloaded, as well as on about the same level as the floors of cars that are standing upon the said platform.

In testimony whereof I have signed my name to this specification in presence of two subscribing witnesses.

GUSTAVE A. HANSEN.

Witnesses:
FRANCIS HOOVER ROSENBAUM,
JOHN C. HIGDON.